United States Patent [19]

Beech et al.

[11] Patent Number: 4,701,600
[45] Date of Patent: Oct. 20, 1987

[54] SYSTEM FOR ENTERING INITIALIZING DATA ON THE REAR FACE OF AN INTEGRATED CHIP CARD

[75] Inventors: Brian Beech, Bloomington; Jeff Rust, Brooklyn Park; Alan Meilach, Prior Lake; Rod LeVasseur, Lakeville, all of Minn.

[73] Assignee: Data Card Corporation, Minneapolis, Minn.

[21] Appl. No.: 844,604

[22] Filed: Mar. 27, 1986

[51] Int. Cl.[4] .............................. G06K 17/00
[52] U.S. Cl. ..................... 235/375; 235/492
[58] Field of Search .................. 235/375, 492

[56] References Cited

U.S. PATENT DOCUMENTS 4,166,574  9/1979  Yokoyama .................. 235/375

Primary Examiner—Harold I. Pitts
Attorney, Agent, or Firm—Faegre & Benson

[57] ABSTRACT

A credit card having an integrated circuit. The card is processed, including formation and encoding.

8 Claims, 8 Drawing Figures

U.S. Patent  Oct. 20, 1987  Sheet 1 of 2  4,701,600
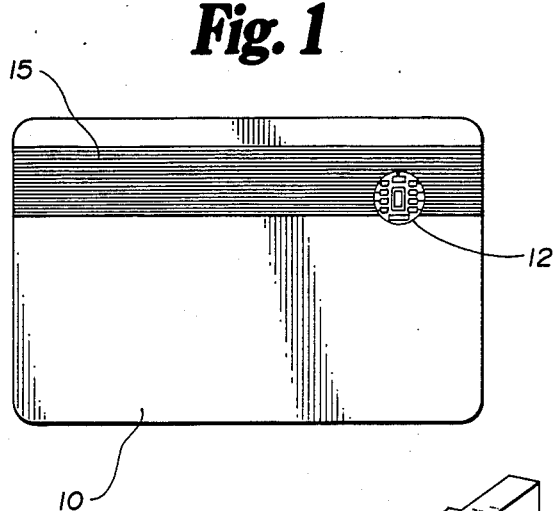
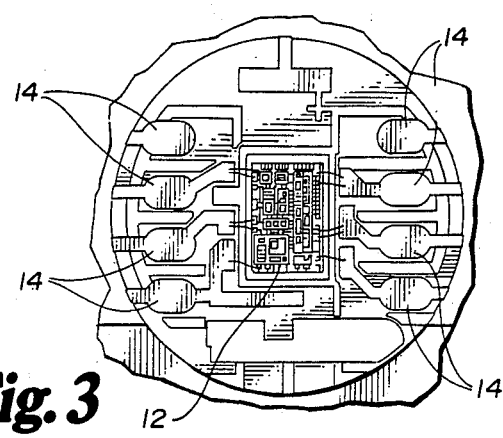
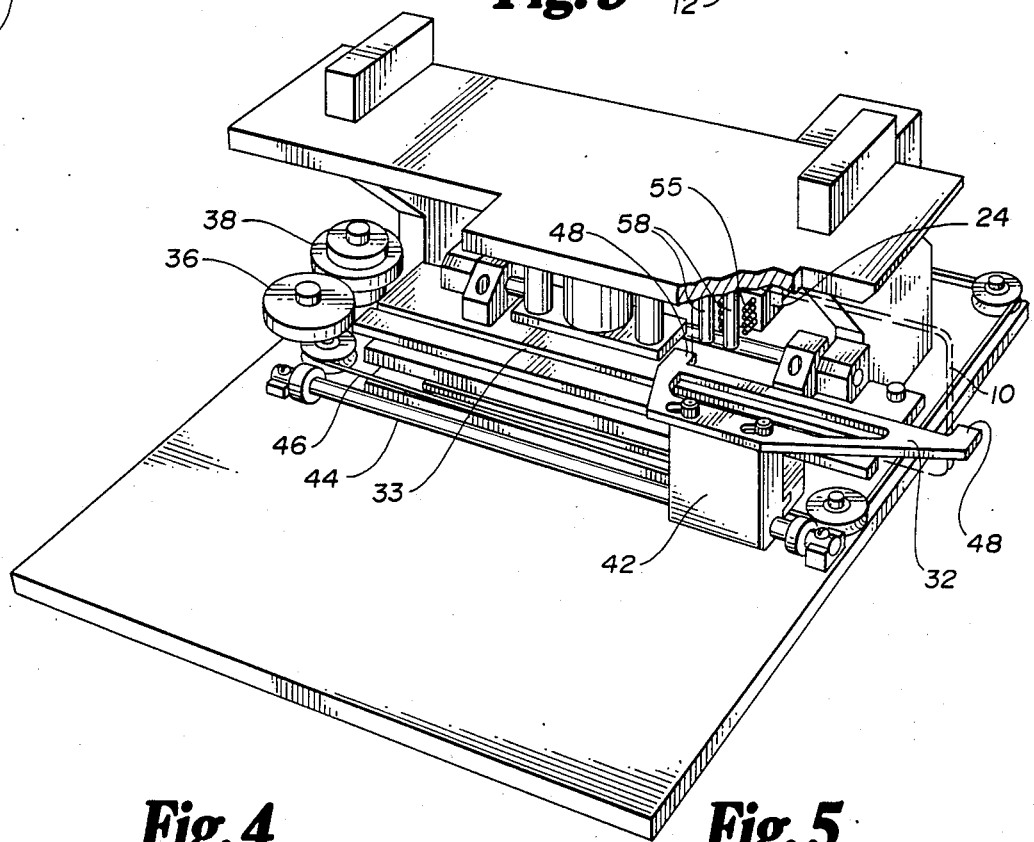
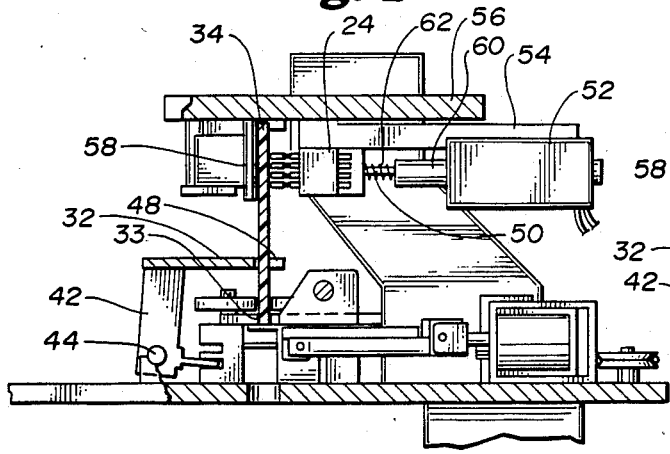
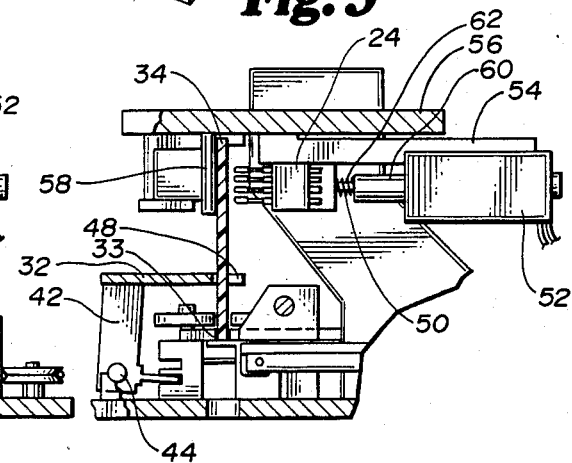

4,701,600

SYSTEM FOR ENTERING INITIALIZING DATA ON THE REAR FACE OF AN INTEGRATED CHIP CARD

BACKGROUND OF THE INVENTION

This invention relates to an apparatus for programming integrated chip cards; that is, thin cards which have embedded therein a microprocessor and memory which can be accessed through contacts on the surface of the card. More particularly, it relates to the apparatus for entering data through contacts on the rear face of the card as concomitant step in an over-all process of entering initializing data on the card, including embossing the front face.

As will be appreciated by those skilled in the art, over the past several years, technology has advanced to the point where it is practical to embed a microprocessor and memory chips in cards for use by individuals. These cards are usually plastic; so-called credit cards being one common example. However, it should be noted that the integrated chip card has many additional applications, not all of which are financially related. In these cards, the microprocessor contacts are flush with the surface of the card so that data may be entered, altered, and retrieved from the memory. In initializing the card, certain data peculiar to an individual or an application must be entered into the microprocessor memory and this must be consistent with various other data encoded on the card during the initialization process, including data embossed on the card.

SUMMARY OF THE INVENTION

An object of this invention is the provision of an apparatus and system in which data is entered into the microprocessor memory as a concomitant step in an over-all process of data entry on the card. Another object of the invention is to provide a system which is relatively low cost, simple, and reliable in its operation.

Briefly, this invention contemplates the provision of a system in which integrated chip cards are moved automatically along a predetermined path to or from card data entry stations such as card embossing apparatus. A retractable head along the path carries spring-loaded pins which, in the extended position of the head, engage contacts on the rear face of the card to transfer data to the microprocessor. In the retracted position of the head, the pins are clear of the card allowing it to be moved along the path.

BRIEF DESCRIPTION OF THE DRAWINGS

FIG. 1 is a pictorial view of the rear face of integrated chip card showing the microprocessor contacts;

FIG. 1(a) is an enlarged detailed view of the microprocessor contacts shown in FIG. 1;

FIG. 3 is a partial perspective view showing a retractable head positioned along the card path in accordance with the teachings of this invention;

FIG. 4 is a partial side elevation of the head shown in FIG. 3 with the head in its extended position;

FIG. 5 is another partial side elevation similar to FIG. 4 with the head in its retracted position;

DETAILED DESCRIPTION OF THE PREFERRED EMBODIMENTS

Referring now to FIGS. 1 and 1(a), an integrated chip card 10 has a microprocessor and memory 12 embedded therein shown in phantom. A series of contacts 14 flush with the surface of the card allow data to be read into and read out of the integrated chip card both during the initialization process and in use. The contacts 14 on the card shown in FIGS. 1 and 1(a) are accessible on the rear face of the card. That is, the opposite side of the card from which characters are raised after an embossing process. There is a magnetic strip 15 on this rear face.

Figure 2:
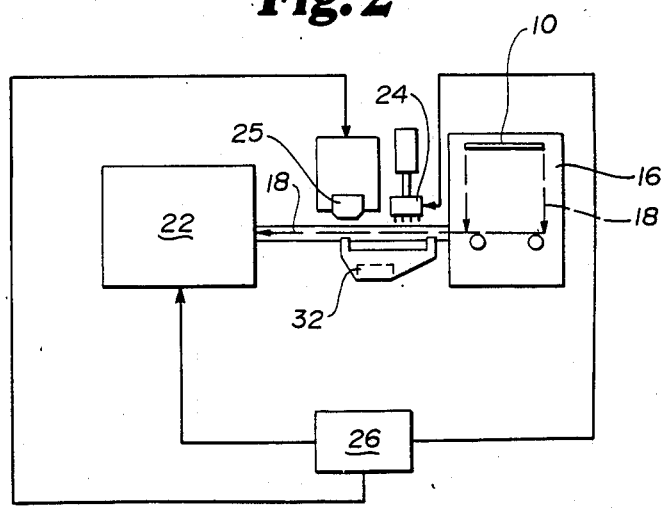
FIG. 2 is a schematic diagram of an overall system for initializing the microprocessor and embossing an integrated chip card in accordance with the teachings of this invention.

Referring now to FIG. 2, the major elements in this illustrative embodiment of the invention comprised an input magazine 16, a path 18 along which the cards move, an embossing apparatus 22. A retractable head 24 is disposed adjacent to the path 18. This particular embodiment also includes head 25 for writing and reading data on the magnetic strip 15 the rear face of the card. A card transfer shuttle 32 moves the cards along part of the predetermined path 18.

The magazine 16 may be constructed in accordance with the teachings of U.S. Pat. No. 4,519,600 assigned to the assignee of this invention and incorporated herein by reference. The embosser 22 may also be constructed in accordance with the teaching of this U.S. Pat. No. 4,519,600.

The apparatus for reading and writing information on a magnetic strip on the card may be constructed in accordance with U.S. Pat. No. 4,518,853 also assigned to the same assignee as this invention and incorporated herein by reference. This patent also shows in detail the shuttle to translate the cards between the magazine and the embosser.

In the embodiment shown, the sequence of operation is to first position the card next to the head 24, next to initialize the microprocessor on a card by means of the retractable head 24, then to move the card through the magnetic strip recorder and to the embosser 24 where additional and corresponding data is embossed upon the card. A computer controller and information storage unit 26 feeds data to the head, to the magnetic strip recorder, and the embosser. It will be appreciated that the head can also read data out of the chip on the card and transfer it to the computer controller and information storage unit 26. This information read out of the card can be used for further processing and or verification or merging or the like. The data from the card may also serve to generate inputs from the controller to other data entry stations along the path 18.

Referring now to FIG. 3, a guide slot 33 forms in part the path 18 for a card stripped from the magazine 16. Slot 33 in combination with a top guide slot 34 supports the card in a substantially vertical position as it is moved along the card transfer path 18 from right to left in FIG. 3 across the magnetic strip recorder into the nip of a pair of drive wheels 36 and 38 which engage the leading edge of a card as it reaches the end of the path.

The card transfer shuttle 32 engages the card as it leaves the magazine and moves it along the card transfer path. The transfer shuttle 32 is mounted on a slidable support block 42 which rides on a bar 44. A cable 46 driven by a motor (not shown) drives the support block and card transfer shuttle back and forth along the card transfer path.

The card transfer shuttle can assume either of two positions. In the first, the shuttle is tilted toward the card transport path so that fingers 48 can engage and push the cards along the path in either direction. In its other position, the carriage and card transfer shuttle is tilted to a generally vertical position and the fingers are clear of the card transfer path.

The mechanism for moving the card transfer shuttle between its position for engaging the card and its position clear of the path is fully described in U.S. Pat. No. 4,518,853 to which reference may be made for a detailed explanation.

Figure 6:
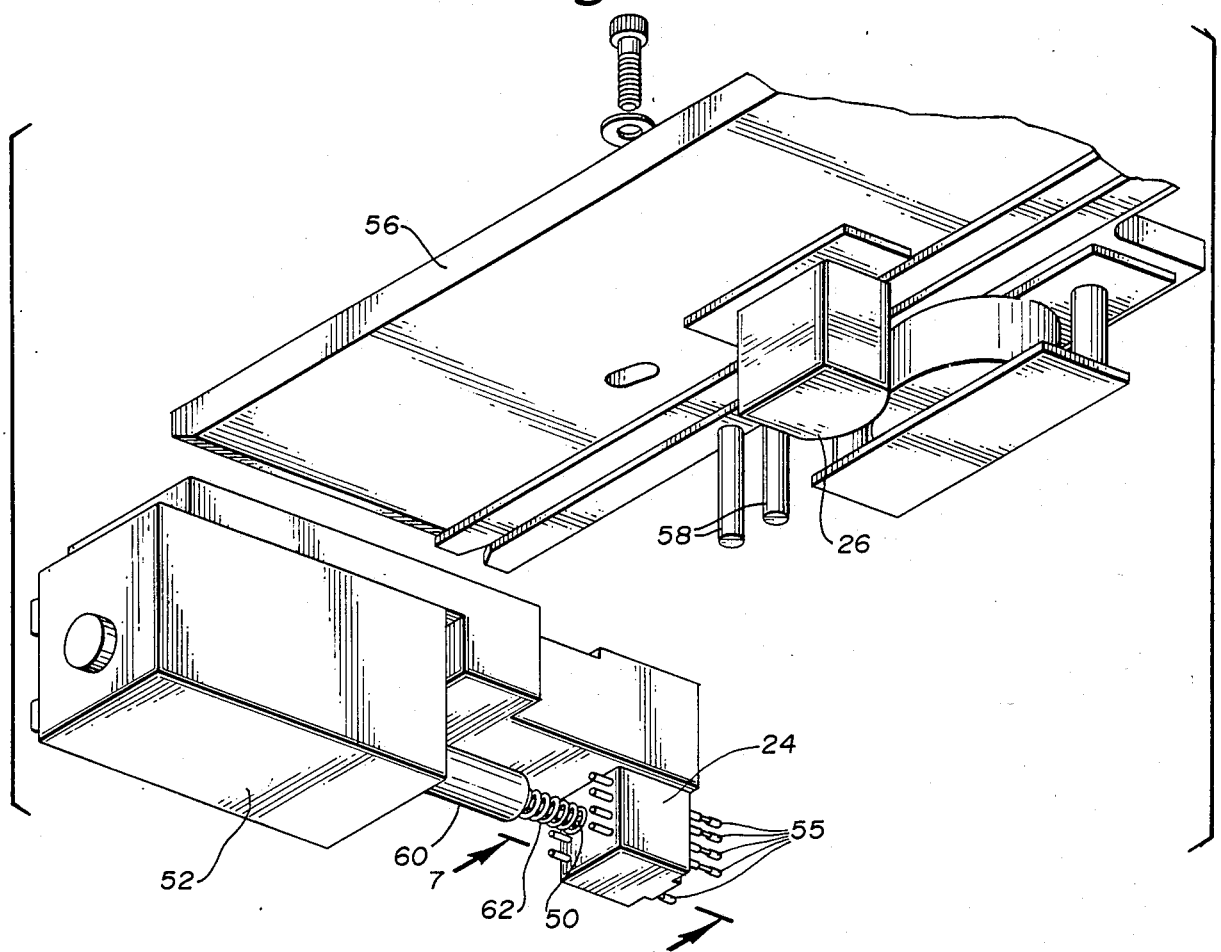
FIG. 6 is another perspective view of the head assembly.

Referring now to FIGS. 4, 5, and 6 as well as FIG. 3, the head 24 is secured to the end of a movable arm 50 of a solenoid actuator 52. A bracket 54 secures the solenoid to a plate 56 from which depend a path of posts 58 which support the card when the head engages the contacts on the microprocessor chip. The arm 50 rides in a fixed sleeve 60 secured to the solenoid. A compression spring 62 urges the head to its extended position and actuation of the solenoid retracts the head. A suitable photoelectirc detector which detects the position of the edge of the support block 42, for example, positions the card with respect to the head 24.

Figure 7:
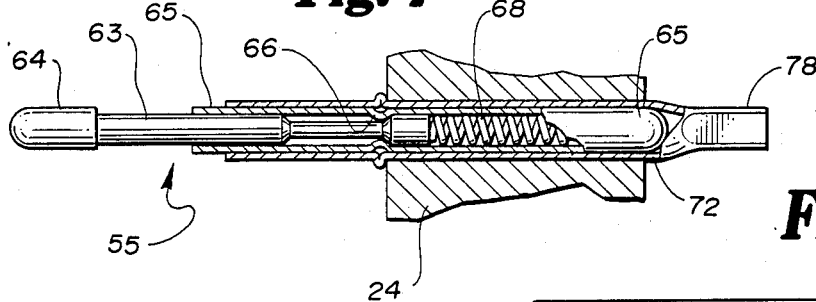
FIG. 7 is a detail view with parts in section of a pin contact.

As shown in FIG. 7, the contacts or fingers 55 each comprised a spring-loaded pin 63 with a rounded tip 64 which rides in a tube 65. An annular rib 66 limits the travel of the pin in the tube. A soft compression spring 68 urges the pin 62 forward, so that when the rounded tips of the pins engage the contacts on the front surface of the card, the pins each firmly engage a microchip contact without the critical tolerancing. The tube 65 is press fit in a sleeve 72 and the sleeve is secured in a bore in an insulating block to comprise the head 24. A terminal 78 extends out the back of the block for making electrical connections to the pin.

In operation, the magazine advances each integrated chip card in the stack toward the recording head 24 along a path parallel to the motion of the head. When a card is in position, a suitable sensor (not shown) indicates this situation to the control unit and it causes the solenoid 52 to be de-energized, whereby the compression spring extends the head and the resilient pins engage the contacts on the rear face of the card. After contact is made, data is transferred to and from the control unit 26 to the card in order to initialize it. The head then retracts and the card is moved along the path to the embossing unit 22. Data corresponding to that fed to the card memory from the control unit is coupled to the embosser, and in the embodiment shown, also to the magnetic character recorder. It will be appreciated that the sequence shown here is merely illustrative, and that the sequence of data entry stations along the path 18 may be varied.

Thus, it will be appreciated that the objects of the invention have been achieved. Data is entered into the microprocessor memory of the integrated chip card as a concomitant step and an over-all process of initial data entry on the card including embossing data thereon. This is accomplished in a relatively low-cost, simple and reliable operation.

What is claimed is:

1. A system for entering initializing data on an integrated chip card in which a pattern of contacts for transferring data in and out of said integrated chip card are on a face of the card, comprising in combination:
   a magazine for holding a stack of integrated chip cards;
   means for moving each of said integrated chip cards along a predetermined path to enter data on said integrated chip card at a plurality of data entry stations;
   said moving means including means for withdrawing an integrated chip card from said stack to expose the face of the next integrated chip card in said magazine;
   a head positioned adjacent said path, said head carrying a plurality of electrically conducting contacts arranged in a pattern to engage said pattern of contacts on said integrated chip card; and
   means for moving said head between a position clear of said path and a position at which the contacts on said head engage the contacts on a face of an integrated chip card which has been withdrawn from said magazine.

2. A system as in claim 1 further comprising a controller and data storage unit coupled to said contacts for transferring data to and receiving data from said integrated circuit chip card; said controller transferring data to at least one of said data stations along said path based on data received from said card.

3. A system for entering initializing data on an integrated chip card in which a pattern of contacts for transferring data to said integrated chip card are on a rear face of the card, comprising in combination:
   a magazine for holding a stack of integrated chip cards;
   means for moving each of said integrated chip cards along a predetermined path to enter data on said integrated chip card;
   said moving means including means for withdrawing an integrated chip card from said stack to expose the front face of the next card in said magazine;
   a head positioned adjacent said path, said head carrying a plurality of electrically conducting contacts arranged in a pattern to engage said pattern of contacts on said integrated chip card; and
   means for moving said head between a position clear of said path and a position at which the contacts on said head engage the contacts on the rear face of an integrated chip card which has been withdrawn from said magazine.

4. A system for entering initializing data on an integrated chip card as in claim 1 wherein said electrically conducting contacts are resilient pins.

5. A system for entering initializing data on an integrated chip card as in claim 2 wherein said electrically conducting contacts are resilient pins.

6. A system for entering initializing data on an integrated chip card as in claim 3 wherein said means for moving said head includes a solenoid-operated arm.

7. A system for entering initializing data on an integrated chip card as in claim 4 wherein said means for moving said head includes a solenoid-operated arm.

8. A system for entering initializing data on an integrated chip card as in claim 1 wherein said plurality of data entry stations includes means for embossing and/or mag stripe encoding said integrated chip cards.

* * * * *